(12) United States Patent
Chen

(10) Patent No.: US 11,148,046 B2
(45) Date of Patent: Oct. 19, 2021

(54) CHIP STRUCTURE OF VR SELF-SERVICE GAME JOY STICK

(71) Applicant: VR LEO USA, INC., Los Angeles, CA (US)

(72) Inventor: Xiuchao Chen, Shanghai (CN)

(73) Assignee: VR LEO USA, INC., Los Angeles, CA (US)

( * ) Notice: Subject to any disclaimer, the term of this patent is extended or adjusted under 35 U.S.C. 154(b) by 0 days.

(21) Appl. No.: 16/713,546

(22) Filed: Dec. 13, 2019

(65) Prior Publication Data

US 2020/0114257 A1    Apr. 16, 2020

Related U.S. Application Data

(63) Continuation-in-part of application No. 16/249,831, filed on Jan. 16, 2019.

(30) Foreign Application Priority Data

Jan. 16, 2018    (CN) .......................... 201810041883.9
Jul. 6, 2018    (CN) .......................... 201810738220.2
Dec. 13, 2018    (CN) .......................... 201822092662.2

(51) Int. Cl.
*A63F 13/24*    (2014.01)
*A63F 13/245*    (2014.01)

(52) U.S. Cl.
CPC .... *A63F 13/245* (2014.09); *A63F 2300/8082* (2013.01)

(58) Field of Classification Search
CPC .................... A63F 13/23; A63F 13/245; A63F 2300/1025; A63F 2300/1062; A63F 2300/8082
See application file for complete search history.

(56) References Cited

U.S. PATENT DOCUMENTS

| | | | | |
|---|---|---|---|---|
| 5,874,944 A * | 2/1999 | Khoury | ................. | G06F 1/3215 345/161 |
| 6,067,077 A * | 5/2000 | Martin | .................... | A63F 13/06 345/161 |
| 6,251,014 B1 * | 6/2001 | Stockdale | ............... | G07F 17/32 463/16 |
| 6,422,941 B1 * | 7/2002 | Thorner | ................. | A63F 13/02 463/30 |
| 6,459,175 B1 * | 10/2002 | Potega | ................ | H02J 7/00041 307/149 |
| 6,781,570 B1 * | 8/2004 | Arrigo | .................. | G06F 3/0317 345/156 |
| 7,445,551 B1 * | 11/2008 | Okada | ..................... | A63F 13/00 463/43 |
| 9,110,505 B2 * | 8/2015 | Mastandrea, Jr. | ...... | G06F 3/017 |
| 9,409,087 B2 * | 8/2016 | Soelberg, III | ......... | A63F 13/213 |

(Continued)

FOREIGN PATENT DOCUMENTS

JP    2000056850 A *    2/2000    .......... H04L 7/0278

*Primary Examiner* — Steven J Hylinski
(74) *Attorney, Agent, or Firm* — M.J. Ram and Associates

(57) ABSTRACT

An improved VR self-service game joy stick chip assembly comprising a controller, a power source converter, a sensor and interfaces/links, the power to operate the assembly being provided by an external, hard-wired power source. The sensor senses movement thereof and through two-way connections to the controller and a computer interface turns on the joy stick and connected devices.

1 Claim, 3 Drawing Sheets

(56) References Cited

U.S. PATENT DOCUMENTS

| | | | |
|---|---|---|---|
| 9,711,980 B2* | 7/2017 | Hodges | G06F 1/266 |
| 2001/0000663 A1* | 5/2001 | Shahoian | G06F 3/016 |
| | | | 345/156 |
| 2001/0010513 A1* | 8/2001 | Rosenberg | A63F 13/06 |
| | | | 345/156 |
| 2001/0026264 A1* | 10/2001 | Rosenberg | G06F 3/03545 |
| | | | 345/156 |
| 2008/0174550 A1* | 7/2008 | Laurila | A63F 13/06 |
| | | | 345/158 |
| 2009/0069081 A1* | 3/2009 | Thorner | A63F 13/285 |
| | | | 463/30 |
| 2010/0235667 A1* | 9/2010 | Mucignat | H04W 52/0254 |
| | | | 713/323 |
| 2011/0254760 A1* | 10/2011 | Lloyd | G01P 15/00 |
| | | | 345/156 |
| 2011/0266997 A1* | 11/2011 | Krancher | H02J 7/0044 |
| | | | 320/107 |
| 2015/0002278 A1* | 1/2015 | Shah | G08B 6/00 |
| | | | 340/407.1 |
| 2016/0026253 A1* | 1/2016 | Bradski | H04N 13/344 |
| | | | 345/8 |
| 2018/0059801 A1* | 3/2018 | Acun | G06F 3/0234 |
| 2019/0065027 A1* | 2/2019 | Hauenstein | G06F 3/011 |

* cited by examiner

CHIP STRUCTURE OF VR SELF-SERVICE GAME JOY STICK

This application claims benefit of Chinese Patent Application No. 201822092662.2 filed Dec. 13, 2018 and is a Continuation-in-Part of U.S. application Ser. No. 16/249,831 filed Jan. 16, 2019, which claims the benefit of Chinese Patent Application No. 201810738220.2 filed Jul. 6, 2018 and Chinese Patent Application No. 201810041883.9 filed Jan. 16, 2018.

SUMMARY

The present application relates to a joy stick for a Virtual Reality (VR) game device and in particular to a joy stick chip structure capable of providing self-service when the VR joy stick is used in an offline commercial environment.

BACKGROUND

VR game equipment as used herein is a device that can provide VR games. It is usually placed in subways, shopping malls and other places, and allows game players to play games by themselves without assistance from a service staff.

A joy stick for such a VR game device is a device typically held in a player's hand. A sensor provided in the joy stick is capable of sensing changes in a certain part of the player's body to operate as desired in various games.

The currently available VR game joy sticks have the following deficiencies:

1. Problems with the data connection method of a VR joy stick: the data connection method of a VR joy stick typically uses a Bluetooth wireless connection. As a result, during its operating process, a joy stick is susceptible to interference from the surrounding environment, which may cause unstable data transmission interruption and other issues.

2. Problems with the battery-powered mode of a VR joy stick: the current method of power supply for a VR joy stick is as follows: opening a battery compartment cover on a joy stick, and then placing two AA batteries therein for power supply. As a result, during its operating process, a joy stick is susceptible to signal interruption and data transmission failure due to insufficient power from the batteries.

3. Problems with the manner in which a main menu key of a VR joy stick can be activated—a VR joy stick may have a number of different keys. In the case where a joy stick is in a power off state, a user needs to press a main menu key on the joy stick in order to activate the joy stick. Moreover, a joy stick will enter a sleep mode when it is not in operation for a certain period of time. In this case, a user needs to press the main menu key on the joy stick again in order to wake up the joy stick and the attached VR device. In the foregoing processes, the waiting time for activation or wake up is relatively long (it could be from about 10 to 15 seconds), which may affect the user experience. In addition, during its operating process, a VR joy stick is susceptible to malfunction, for example, the main menu key may be pressed accidently to cause the operation to be interrupted or even cause the system to crash, thus affecting the normal operation of the VR device.

4. Problems with the anti-theft function of a VR joy stick—the wireless connection manner employed by a VR joy stick makes the joy stick easy to loose, which may cause property loss. As a result, it is not suitable to be provided in public places.

DETAILED DESCRIPTION

Figure 1:
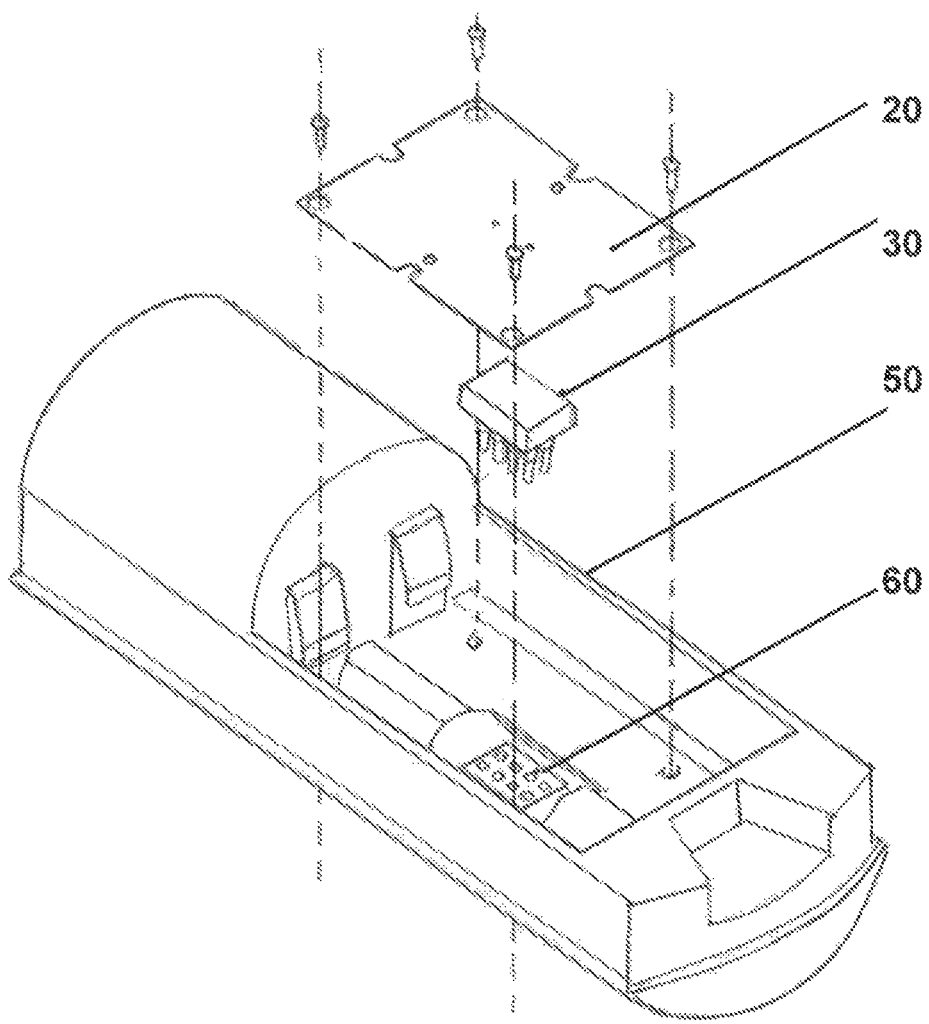
FIG. 1 is an expanded top view showing a modified power supply module portion of a joy stick incorporating features of the invention.

In order to solve the above technical problems, a present embodiment incorporating features of the invention includes improvements to the chip circuit structure of the prior VR joy stick, and uses a customized chip to replace the original power supply module and communication module provided in prior devices. In addition, the mode of power supply by AA batteries is also changed, and a plurality of different signal transmission methods are made available to the joy stick.

The technical solutions employed to solve the technical problems comprises a chip structure of a VR self-service game joy stick including a controller 102 on a chip circuit board 20, a power source converter 110, a sensor 104 and communication interface between the various components.

The controller 102 is connected to the power converter 110 through a control interface 108. The power converter 110 converts the computer interface power 122 and connects it with the VR game joy stick 50, so as to provide power to the joy stick 50. The controller 102 is also connected to the sensor 104 through communication interface 106, 107 to implement two-way communication. The sensor 104 is configured to sense a movement state of the joy stick 50.

The controller 102 is also connected with a computer interface 102 through an interface conversion 114 and interface expansion 112 sequentially so as to implement two-way communication. The power to the controller 102 comes from the computer interface 120 and a dedicated power source converter 110 which converts the power source to provide power to the controller 102.

The joy stick 50 is connected with an interface expansion 112 through a communication interface 106, and achieves the two-way communication with a computer through a computer interface 120. The chip circuit board 20 includes two modules (not shown) in its logic structure, namely a signal transmission module and a power supply module. The signal transmission module is configured to transmit signals using USB, Bluetooth, and/or WiFi.

The power supply module is configured to accept the power provided by an external power supply to replace the original battery power supply.

The present embodiment has the beneficial effect that the joy stick provided uses a customized chip to replace the previously used power supply module and the communication module.

The customized chip uses an external power supply to replace the prior used AA battery power supply provided so as to ensure the stability of the power supply for the joy stick 50 and the capability of self-service in operation.

The signal transmission method of the customized chip includes, but is not limited to, Bluetooth, WiFi, USB, etc. or a combination thereof, and can be adapted to different applications. Without damaging the original circuit, the function of the main menu key of the joy stick is blocked; in addition, a gravity sensing wake-up function is added. In the case where a game is started or the joy stick 50 is picked up by a user, the joy stick 50 according to the present embodiment will wake up automatically when it senses the change of gravity (movement), and it will automatically sleep after not being used for a certain period of time (for example 12 minutes).

The present embodiment is further described in detail with reference to FIGS. 1-3.

FIG. 1 is an expanded top view showing a modified joy stick 50 and power supply incorporating features of the invention.

Figure 2:
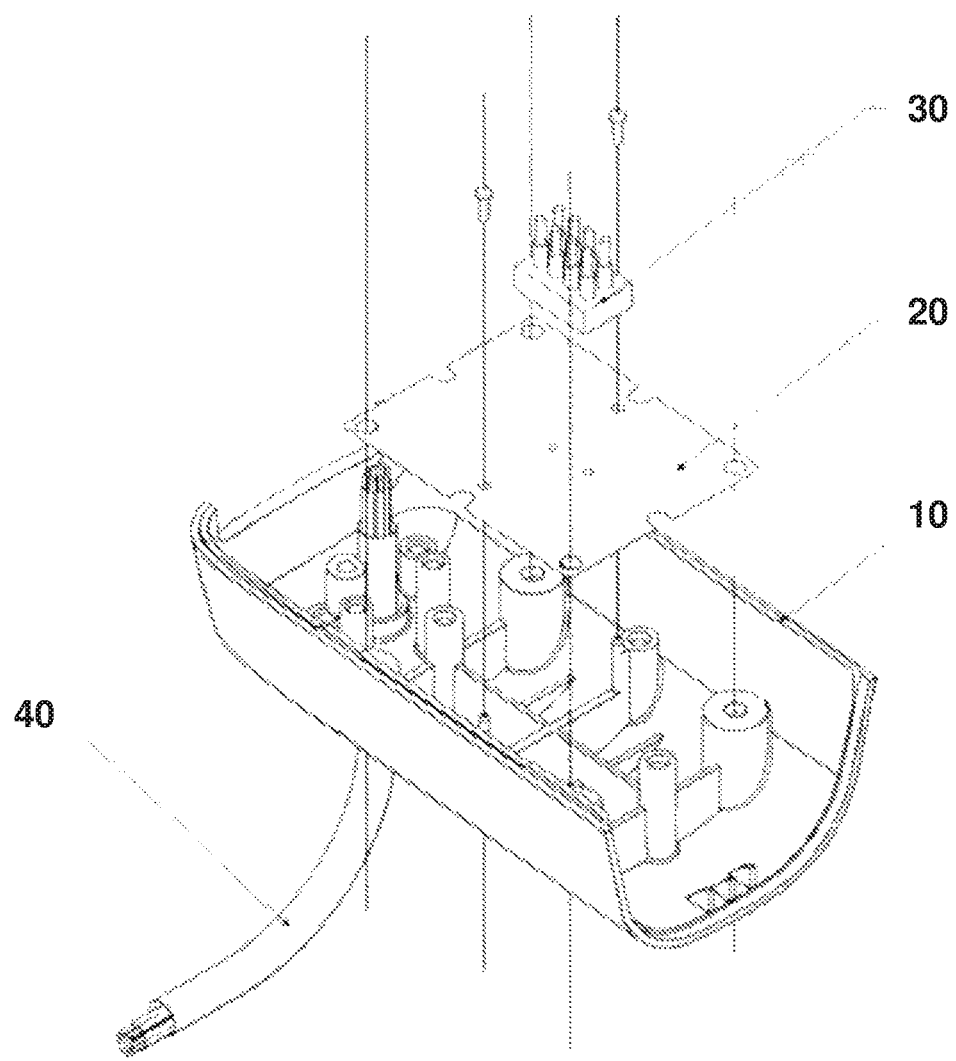
FIG. 2 is an expanded bottom view of the joy stick of FIG. 1.

FIG. 2 is an expanded bottom view of the joy stick 50 and power supply of FIG. 1.

With reference to FIG. 1 and FIG. 2 the joy stick back cover 10, receives the circuit board 20, and a spring needle assembly 30. A power supply cable 40 is attached to the circuit board 20 of the joy stick 50. When assembled, the spring needle assembly 30 operatively contacts a spring needle metal contact surface 60.

Figure 3:
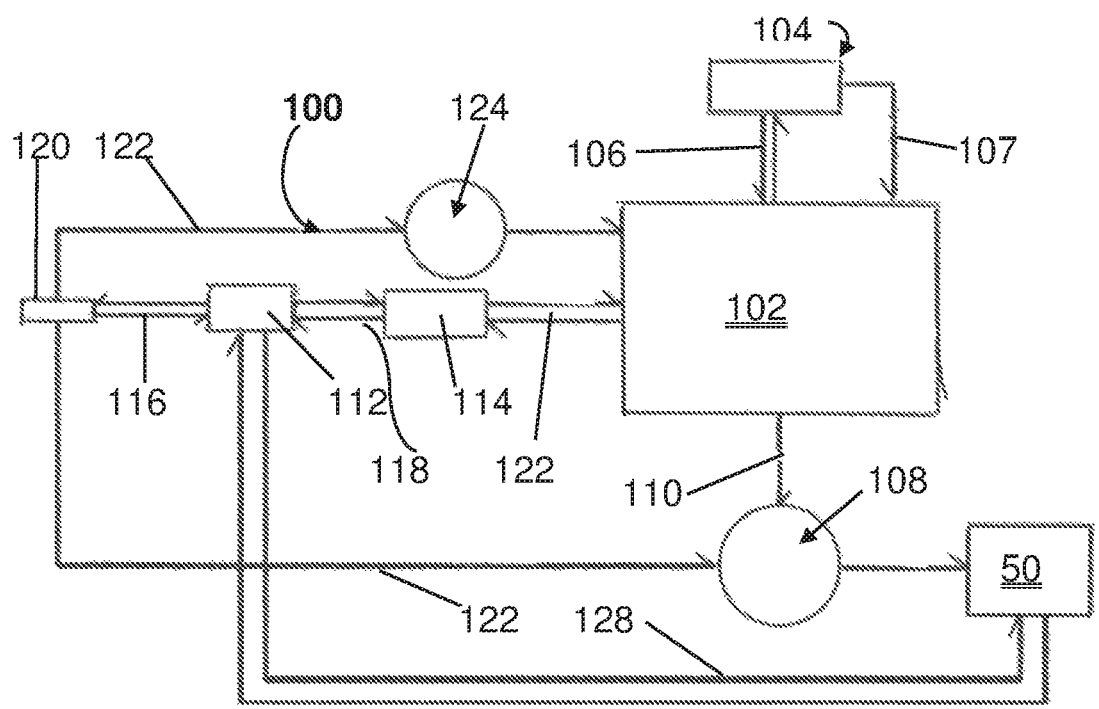
FIG. 3 is a schematic diagram of a joy stick chip circuit board incorporating features of the invention.

FIG. 3 is a schematic diagram of the chip circuit board 20.

Through testing a prior used VR joy stick, it was found that it has certain deficiencies in an actual offline operating environment. It cannot meet the requirements of providing the functions of data transmission, anti-theft, continuous power supply and complete user experience in an offline unattended situation of VR devices. In addition, the manufacturers of existing joy sticks cannot make special improvements in a short period of time. In light of the foregoing, the following modifications described herein were made to the power supply modules to provide the new VR joy stick.

a) The power supply module was changed and a power cable attached to an external power supply was provided to replace the prior art battery power supply, and b) the communication module was changed and a chip suitable for signal transmission using USB, Bluetooth and/or WiFi was provided;

c) the joy stick now has the functions of auto wake up and auto sleep.

As shown in FIGS. 1 and 2, the VR joy stick power supply module is primarily composed of a joy stick housing 10, a chip circuit board 20, a spring needle assembly 30, and a power supply cable 40. The circuit board 20 and the spring needle assembly 30 are installed inside the joy stick housing (back cover) 10. One end of the power supply cable 40 is soldered to the circuit board 20, and the other end thereof passes through the joy stick housing 10 and is then connected to an external power supply (not shown). The spring needle 30 is connected to a metal contact surface 60 within the joy stick housing 10, which functionally connects the chip circuit board 20 with the joy stick, and plays the roles of signal transmission and power supply.

FIG. 3 is a schematic diagram of the chip circuit board 20 that provides a computer interfaces 120, a communication interface 116 thereto comprises a first communication interface 118 and a second communication interface 122 connected to an interface expansion circuit 112; in which the first communication interface 118 and the second communication interface 122 can be USB, Bluetooth and/or WiFi.

The controller 102 on the chip circuit board 100 converts the first and second communication interface 118, 122 into a communication interface that is controlled by the chip interface conversion circuit.

Power from an external power source (not shown) is converted into a power required by the controller 102 by the power source converter 114. The external power source may be an external DC power source.

The sensor 104 is configured to sense the state of the joy stick 50 and reports the relevant information to the controller 102 through a communication interface 106 and provides an output signal 107.

The controller 102 controls the power source converter 110 to be turned on or off according to the state of the information reported by the sensor 104, so as to supply the joy stick 50 with the required power 112.

In the case where the joy stick 50 is powered by a the external power source, the joy stick 50 may indirectly communicate with the computer through a further communication interface 128.

The improved VR joy stick disclosed herein has the following advantages:

1. For the data connection mode: the chip 20 has signal transmission capability including USB, Bluetooth and WiFi, which can be adapted to different scenarios and applications.
2. For the battery power supply mode: after the modification, the joy stick uses the power supply cable 40 to connect to an external power supply, which replaces the AA battery power supply provided by in prior joy sticks. Thus, it can avoid a failure of the joy stick due to insufficient power of the battery, and ensure continuous power supply for the device.
3. For the main menu key activation mode: the embodiment shown has changed the function of the main menu key of prior art joy sticks without damaging the original circuit. In addition, a gravity sensing/motion wake-up function is added to the device. In this way, the described joy stick can automatically wake up when a game starts or a user picks up the joy stick, in which cases the joy stick senses movement or a change in gravity; in addition, the joy stick can automatically sleep when it is not in use for a period of time (for example 12 minutes).
4. An anti-theft function: with the modifications on the joy stick, a custom power supply cable 40 with embedded steel wire is used in the device to increase the strength of the data line and improve the anti-theft function of the joy stick.

While a person skilled in the art can make various modifications and changes to the present embodiment, the present design covers various modifications and changes that fall within the scope of the appended claims and their equivalents.

The invention claimed is:

1. A handheld virtual reality (VR) game joy stick device comprising a housing and a chip structure, the chip structure comprising a controller, a power source converter, a sensor and interfaces, and wherein the chip structure is enclosed within the housing, wherein:
    a) the controller is connected to the power source converter through a control interface;
    b) the controller is connected to a computer interface of a computer via a power supply cable, wherein the power source converter converts power delivered from the computer interface into power usable by the VR game joy stick;
    c) the controller is connected to the sensor through a communication interface to provide two-way communication between the sensor and the controller, wherein the sensor is responsive to movement of the joy stick, said movement also powering on the joy stick and enabling manipulating objects displayed on a VR display screen of the computer responsive to motions of a user operating the joy stick;

d) the controller is connected sequentially with the computer interface through an interface conversion and an interface expansion to implement two-way communication with the computer such that motion sensed by the sensor affects displayed objects on the VR display screen.

<p style="text-align:center">* * * * *</p>